United States Patent
Pustovalov et al.

(10) Patent No.: US 9,210,012 B2
(45) Date of Patent: Dec. 8, 2015

(54) FREQUENCY-DOMAIN TURBO EQUALIZATION, INCLUDING MULTI-MODE ADAPTIVE LINEAR EQUALIZATION, ADAPTIVE DECISION-DIRECTED CHANNEL ESTIMATION, ADAPTIVE NOISE VARIANCE ESTIMATION, AND DYNAMIC ITERATION CONTROL

(75) Inventors: Evgeny Pustovalov, Saint-Petersburg (RU); Andrey Turlikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,410

(22) PCT Filed: Dec. 29, 2011

(86) PCT No.: PCT/RU2011/001047
§ 371 (c)(1),
(2), (4) Date: Jun. 5, 2014

(87) PCT Pub. No.: WO2013/100781
PCT Pub. Date: Jul. 4, 2013

(65) Prior Publication Data
US 2014/0328380 A1 Nov. 6, 2014

(51) Int. Cl.
*H04L 25/03* (2006.01)
*H04L 27/01* (2006.01)
*H04L 25/02* (2006.01)

(52) U.S. Cl.
CPC .... *H04L 25/03885* (2013.01); *H04L 25/03159* (2013.01); *H04L 25/022* (2013.01);
(Continued)

(58) Field of Classification Search
CPC ............. H04L 2025/0349; H04L 2025/03617; H04L 2025/03687; H04L 2025/03732; H04L 1/0036; H04L 1/0047; H04L 1/005; H04L 25/03019; H04L 2025/03675; H04L 2025/03292; H04L 2025/03267; H04L 25/024; H03M 13/6331; H04N 5/4401
See application file for complete search history.

(56) References Cited

U.S. PATENT DOCUMENTS 5,675,394 A * 10/1997 Choi ............................ 348/614
6,700,919 B1 3/2004 Papasakellariou
(Continued)

FOREIGN PATENT DOCUMENTS

EP 0717559 A2 6/1996
EP 1294150 A2 3/2003
(Continued)

OTHER PUBLICATIONS

Notice of Allowance received for Japanese Patent Application No. 2012-010985, mailed on Jul. 23, 2013, 1 page of Notice of Allowance only.
(Continued)

*Primary Examiner* — Chieh M Fan
*Assistant Examiner* — Michelle M Koeth
(74) *Attorney, Agent, or Firm* — Garrett IP, LLC

(57) ABSTRACT

Frequency domain based methods and systems to perform adaptive multi-mode pre-decoding linear equalization, adaptive channel estimation, turbo equalization, turbo equalization iteration control, and noise variance estimation. An adaptive linear pre-decoder equalizer may include a multi-mode equalizer, which may include a blind equalizer to determine initial equalization coefficients and a decision-directed equalizer to refine the initial equalization coefficients. Turbo equalization may include a dynamic iteration termination criterion and/or a fixed termination criterion. Turbo equalization may be based in part on an adaptive estimated noise variance. Methods and systems disclosed herein may be implemented with respect to single-carrier signals such as digital video broadcast signals.

18 Claims, 11 Drawing Sheets

(52) U.S. Cl.
CPC ......... *H04L25/0212* (2013.01); *H04L 25/0224* (2013.01); *H04L 25/0238* (2013.01); *H04L 25/03171* (2013.01); *H04L 2025/0363* (2013.01); *H04L 2025/03414* (2013.01); *H04L 2025/03535* (2013.01); *H04L 2025/03611* (2013.01); *H04L 2025/03636* (2013.01); *H04L 2025/03675* (2013.01); *H04L 2025/03687* (2013.01); *H04L 2025/03726* (2013.01)

(56) References Cited

U.S. PATENT DOCUMENTS

| | | | | |
|---|---|---|---|---|
| 6,980,602 | B1* | 12/2005 | Kleinerman et al. | 375/262 |
| 2003/0058951 | A1 | 3/2003 | Thomson et al. | |
| 2003/0123583 | A1* | 7/2003 | Yellin et al. | 375/349 |
| 2004/0125863 | A1 | 7/2004 | Ghosh | |
| 2007/0064824 | A1* | 3/2007 | Wang et al. | 375/260 |
| 2007/0133672 | A1 | 6/2007 | Lee et al. | |
| 2007/0183517 | A1 | 8/2007 | Liu et al. | |
| 2008/0175309 | A1* | 7/2008 | Fimoff et al. | 375/232 |
| 2009/0245338 | A1 | 10/2009 | Jonsson | |
| 2009/0285274 | A1 | 11/2009 | Shiue et al. | |
| 2010/0128774 | A1 | 5/2010 | He | |
| 2010/0232491 | A1 | 9/2010 | Hayashi | |
| 2011/0004803 | A1 | 1/2011 | Yokomakura et al. | |
| 2011/0069742 | A1 | 3/2011 | Narayan et al. | |
| 2012/0099637 | A1 | 4/2012 | Hu | |
| 2014/0086299 | A1 | 3/2014 | Pustovalov et al. | |
| 2014/0204991 | A1* | 7/2014 | Huang et al. | 375/232 |
| 2014/0211837 | A1 | 7/2014 | Bakin et al. | |

FOREIGN PATENT DOCUMENTS

| | | |
|---|---|---|
| EP | 1584168 B1 | 1/2007 |
| GB | 2449554 A | 11/2008 |
| JP | 2003-152603 A | 5/2003 |
| JP | 2006-352218 A | 12/2006 |
| JP | 2010-087707 A | 4/2010 |
| WO | 2009/099092 A1 | 8/2009 |
| WO | 2012/134319 A1 | 10/2012 |
| WO | 2013/100781 A1 | 7/2013 |

OTHER PUBLICATIONS

Office Action received for Japanese Patent Application No. 2012-010985, mailed on Jun. 18, 2013, 2 Pages of Office Action and 2 Pages of English Translation.
Office Action received for the Chinese Patent Application No. 201210103912.2, mailed on Jun. 4, 2014, 8 pages of Office Action and 12 pages of English Translation.
ATSC, "ATSC Digital Television Standard—Part 2: RF/Transmission System Characteristics", Advanced Television Systems Committee, Doc. A/53 Part 2, Dec. 15, 2011, pp. 1-28.
Banovic, Kevin, "Adaptive Equalization: A Tutorial", Research Centre for Integrated Microsystems—University of Windsor, Oct. 14, 2005, 25 pages.
Benvenuto et al., "Single Carrier Modulation With Nonlinear Frequency Domain Equalization: An Idea Whose Time Has Come Again", Proceedings of the IEEE, vol. 98, Issue 1, Jan. 1, 2010, pp. 69-96.
Garg, Ravi, "Adaptive Equalization Techniques using Least Mean Square (LMS) algorithm", Electrical Engineering, Term Paper, Sep. 12, 2009, 11 pages. available at: <http://www.ece.umd.edu/~ravig/Courses_files/AdaptiveEqualizationLMS_ENEE634.pdf>.
Liu, et al., "Frequency Domain Turbo Equalization for Vestigial Sideband Modulation with Punctured Trellis Coding", Signal Processing Advances in Wireless Communications, 2006, 1 page of Abstract only. available at: <http://en.zl50.com/20100626532945 31. html>.
Hatae et al., "Comparing single and multiple carrier schemes using channel coding", 11th International OFDM-Workshop InOWo, Aug. 30-31, 2006, 5 pages.

Liu et al., "Iterative Frequency-Domain Channel Estimation and Equalization for Single-Carrier Transmissions without Cyclic-Prefix", IEEE Transactions on Wireless Communications, vol. 7, No. 10, Oct. 2008, pp. 3686-3691.
Kim et al., "Near-Optimum Blind Decision Feedback Equalization for ATSC Digital Television Receivers", ETRI Journal, vol. 26, No. 2, Apr. 2004, 1 Page of Abstract only. available at: <http://etrij.etri.re.kr/etrij/journal/article/article.do?volume=26&issue=2&page=101>.
Labat et al., "Adaptive Decision Feedback Equalization: Can You Skip the Training Period", IEEE Transactions on Communications, vol. 46, No. 7, Jul. 1998, pp. 921-930.
MacKenzie, "Presentation", Mackenzie HDTV NEC, Abertset Feb. 5, 2000, 282 Pages.
Mendes et al., "MI-SBTVD: A Proposal for the Brazilian Digital Television System SBTVD", Journal of the Brazilian Computer Society, vol. 12, No. 4, Mar. 2007, pp. 57-82.
Pancaldi et al., "Single-Carrier Frequency Domain Equalization", IEEE Signal Processing Magazine, IEEE Service Center, vol. 25, Issue 5, Sep. 1, 2008, pp. 37-56.
International Preliminary Report on Patentability and Written Opinion received for PCT Patent Application No. PCT/RU2011/000201, mailed on Oct. 10, 2013, 11 Pages.
International Search Report and Written Opinion received for PCT Patent Application No. PCT/RU2011/000201, mailed on Jun. 13, 2012, 16 Pages.
International Preliminary Report on Patentability and Written Opinion Received for PCT Patent Application No. PCT/RU2011/001047, mailed on Jul. 10, 2014, 9 Pages.
International Search Report and Written Opinion received for PCT Patent Application No. PCT/RU2011/001047, mailed on Sep. 21, 2012, 14 pages.
International Search Report and Written Opinion received for PCT Patent Application PCT/RU2012/000042, mailed on Oct. 11, 2012, 13 Pages.
Pham et al., "Enhanced ATSC DTV Channel Estimation", IEEE Conference on Electrical and Computer Engineering, May 3-6, 2009, 1 Page of Abstract only. available at: <http://ieeexplore.ieee.org/xpl/login.jsp?tp=&arnumber=5090233&url=http%3A%2F%2Fieeexplore.ieee.org%2Fxpls%2Fabs_all.jsp%3Farnumber%3D5090233>.
Sohail et al., "A Non-Iterative Channel Estimation and Equalization Method for TDS-OFDM Systems", 7th International Wireless Communications and Mobile Computing Conference (IWCMC), Jul. 4-8, 2011, 5 pages.
Ta-Hong et al., "Decision Feedback Equalizer", Version 1.4, Nov. 14, 2007, pp. 1-2. available at: <http://cnx.org/contents/c6a7dd4e-99e4-429b-ae39-675cda188928@4>.
Takeda et al., "Joint Tomlinson-harashima Precoding and Frequency-Domain Equalization for Broadband Single-Carrier Transmission", IEICE Trans. Commun, vol. E91-B, No. 1, Jan. 1, 2008, pp. 258-266.
Wang et al., "Design and Implementation of Frequency Domain Equalizer for ATSC System", IEEE International Symposium on Broadband Multimedia Systems and Broadcasting, Mar. 31, 2008-Apr. 2, 2008, pp. 1-6.
Wenyi, Dai, "Turbo Equalization of Wireless Communication Systems", China Mater's Theses Full-text Database, Information Technology Section (Monthly), 2009, No. 12, 3 Pages of Abstract only.
Wu et al., "Low Complexity Adaptive Turbo Frequency-Domain Channel Estimation for Single-Carrier Multi-User Detection", IEEE Transactions on Wireless Communications, IEEE Service Center, vol. 7, Issue 11, Nov. 1, 2008, pp. 4094-4099.
Yasmin et al., "Blind Channel Equalization in Impulse Noise", International Journal of Communications, Issue 3, vol. 5, 2011, pp. 132-140.
Zarzoso et al., "Blind Channel Equalization With Algebraic Optimal Step Size", EUSIPCO-2005, XIII European Signal Processing Conference, Sep. 4-8, 2005, pp. 1-4.
Zarzoso et al., "Semi-Blind Constant Modulus Equalization With Optimal Step Size", IEEE International Conference on Acoustics, Speech, and Signal Processing (vol. 3 ), Mar. 18-23, 2005, pp. 1-4.

(56) References Cited

OTHER PUBLICATIONS

Office Action Received for Korean Patent Application No. 10-2013-7025262, mailed on Oct. 29, 2014, 4 pages of English Translation and 5 pages of Korean Office Action.

Office Action received for Chinese Patent Application No. 201210103912.2, mailed on Jan. 28, 2015, 4 pages of English Translation and 3 pages of Chinese Office Action.

ATSC, "ATSC Recommended Practice: Receiver Performance Guidelines", Document A/74:2010, Apr. 7, 2010, 88 pages.

International Preliminary Report on Patentability and Written Opinion received for PCT Patent Application No. PCT/RU2012/000042, mailed on Aug. 14, 2014, 8 pages.

International Preliminary Report on Patentability and Written Opinion Received for PCT Patent Application No. PCT/RU2012/000382, mailed on Nov. 27, 2014, 6 pages.

International Search report and Written Opinion received for PCT Patent Application No. PCT/RU2012/000382, mailed on Feb. 14, 2013, 8 pages.

\* cited by examiner

FREQUENCY-DOMAIN TURBO EQUALIZATION, INCLUDING MULTI-MODE ADAPTIVE LINEAR EQUALIZATION, ADAPTIVE DECISION-DIRECTED CHANNEL ESTIMATION, ADAPTIVE NOISE VARIANCE ESTIMATION, AND DYNAMIC ITERATION CONTROL

BACKGROUND

Conventional single-carrier communication systems, such as digital television (DTV) receivers, use time-domain decision feedback equalizers (DFE) to compensate for signal distortions caused by inter-symbol interference in a wireless channel.

Time-domain decision feedback equalizers are relatively complex, and become more complex for a channel having a relatively long impulse response, as may be encountered with DTV wireless channels.

A frequency domain equalizer may be implemented with less complexity than a time domain DFE.

Where a received signal lacks a cyclic prefix, iterative or turbo equalization may be utilized to achieve a more-satisfactory error rate.

A conventional turbo equalizer may use a pre-defined number of iterations in the equalization of each input block. At low signal-to-noise ratio (SNR), too much iteration may decrease equalizer error rate. At high SNR, too much iteration may cause numerical instability.

BRIEF DESCRIPTION OF THE DRAWINGS/FIGURES

Figure 1:
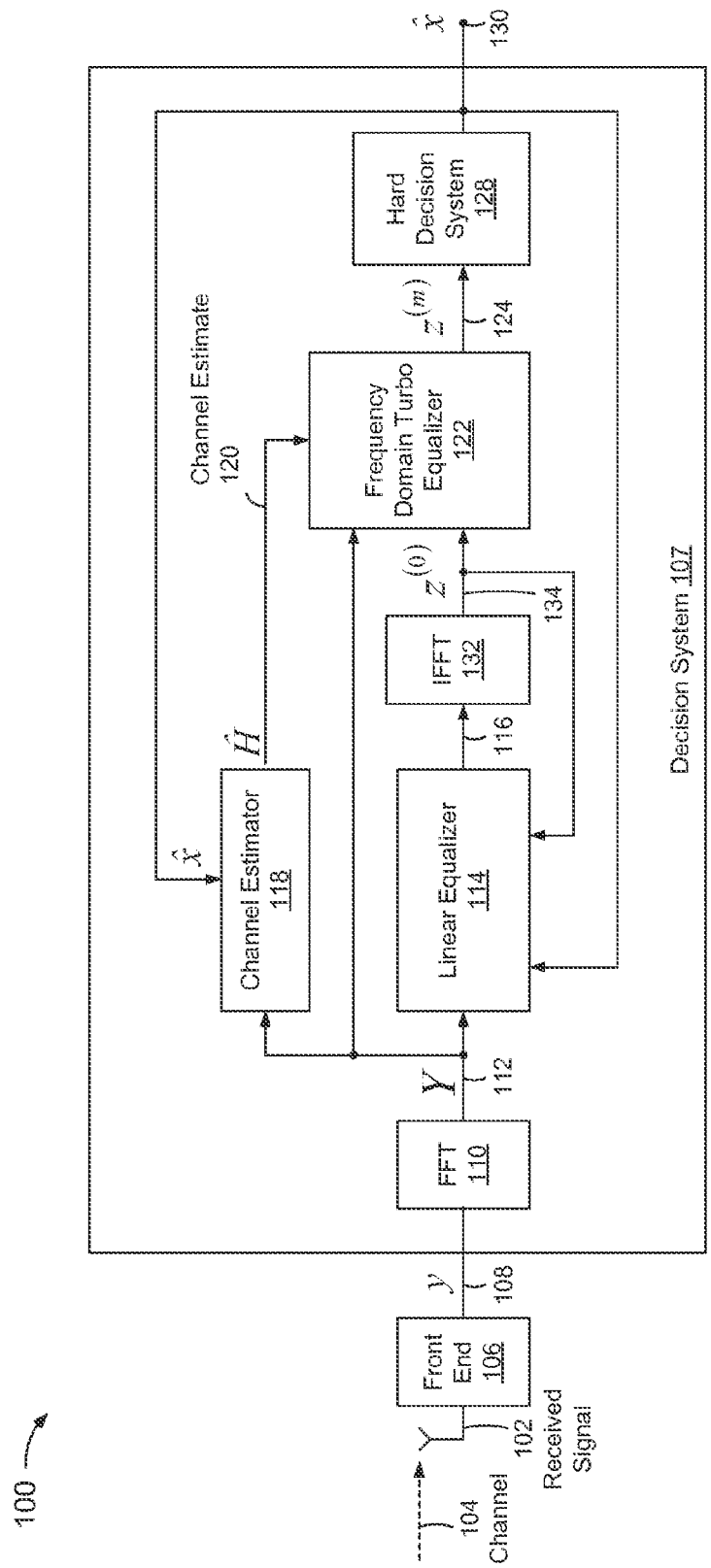
FIG. 1 is a block diagram of a system to perform one or more of adaptive multi-mode pre-decoding linear equalization, adaptive channel estimation, turbo equalization, turbo equalization iteration control, and noise variance estimation, one or more of which may be performed in the frequency domain.

In the drawings, the leftmost digit(s) of a reference number identifies the drawing in which the reference number first appears.

DETAILED DESCRIPTION

FIG. 1 is a block diagram of a system 100 to receive a signal 102 over a channel 104.

Signal 102 may represent a single-carrier signal, such as a digital television broadcast signal, which may be formatted in accordance with a digital television (DTV) standard promulgated by the Advanced Television Systems Committee (ATSC), based in Washington, D.C. System 100 is not, however, limited to these examples.

Channel 104 which may include a wireless channel, characteristics of which may impact symbols of signal 102, such as to rotate constellations of the symbols.

System 100 may include a front end system 106 to frequency down-convert and sample signal 102. System 100 may further include a decision system 107 to evaluate signal 102 and estimate symbols of signal 102 based on the evaluation.

Decision system 107 may be implemented to perform one or more of adaptive multi-mode pre-decoding linear equalization, adaptive channel estimation, turbo equalization, turbo equalization iteration control, and noise variance estimation, one or more of which may be performed in the frequency domain.

Decision system 107 may include a fast Fourier transform (FFT) module 110 to transform time domain samples 108 of signal 102 to a frequency domain representation or frequency tones Y 112.

Decision system 107 may include a linear equalizer 114 to equalize frequency tones 112. Linear equalizer 114 may be implemented as a multi-mode adaptive linear equalizer to equalize frequency domain tones 112 based one or more of multiple selectable equalization techniques.

Decision system 107 may include an inverse fast Fourier transform (IFFT) module 132 to transform equalized frequency tones 116 to time domain bits or samples 134, also referred to herein as a time domain output of linear equalizer 114.

Decision system 107 may include a channel estimator 118 to generate a channel estimate 120, such as a channel frequency response and/or a channel impulse response.

Channel estimator 118 may be implemented to generate channel estimate 120 from pilots or pilot signals of signal 102.

Alternatively, or additionally, channel estimator 118 may include an adaptive decision-directed channel estimator to generate channel estimate 120 based on prior decisions and an adaptive variable step size (VSS) algorithm. An adaptive decision-directed channel estimator may be useful for a relatively long channel response where a pilot sequence may be too short to estimate the channel, and/or for a time-varying channel response where an interval between pilot sequences may be too long to estimate the channel.

Decision system 107 may include a frequency domain turbo equalizer 122 to generate estimated symbol decisions 124 from frequency domain tones 112 based on time domain output 134 of linear equalizer 114, channel estimate 120, and prior decisions.

Decision system 107 may include a hard decision system 128 to generate hard decisions 130 regarding symbols of signal 102. Hard decision system 128 may include, for example, a Viterbi decoder.

Decision system 107, or portions thereof, may be implemented as described in one or more examples below.

Figure 2:
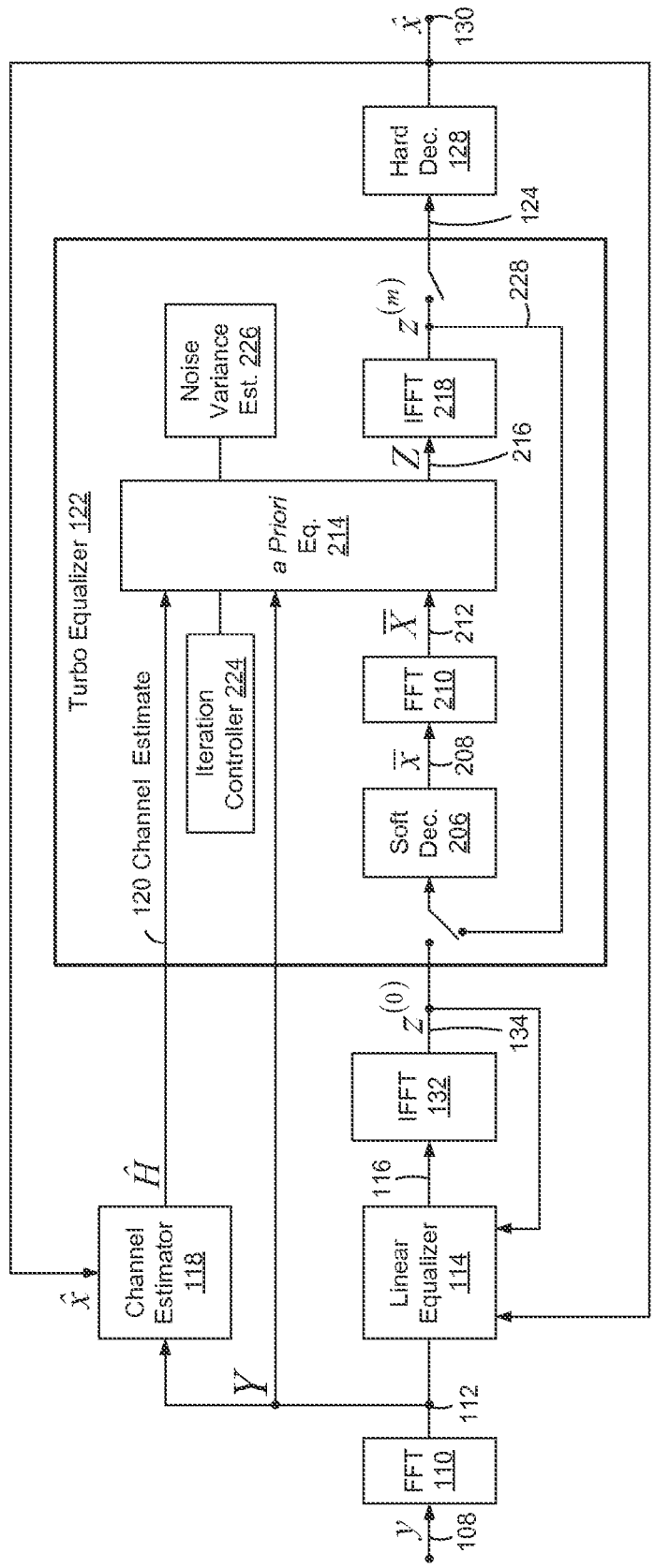
FIG. 2 is a block diagram of an example implementation of a frequency domain based turbo equalizer, including an adaptive noise variance estimator and dynamic iteration control.

FIG. 2 is a block diagram of an example implementation of turbo equalizer 122 including an adaptive noise variance estimator 226 and an iteration controller 224. Methods and systems disclosed herein are not limited to the example of FIG. 2.

Turbo equalizer 122 further includes a soft decision module 206 to generate soft decisions 208. Soft decisions 208 may include estimated bit values and corresponding probabilities of correctness.

Soft decision module 206 may include a Maximum a Posteriori (MAP) decoder to provide a set of posterior probabilities for a symbol of signal 102 based on a time-domain output $z^{(O)}$ 134 of linear equalizer 114 or results $z^{(m)}$ 228 of prior iterations.

A set of posterior probabilities may be represented as:

$$\{p(x_i = s|z)\}_{s \in S} \quad \text{EQ. (1)}$$

A soft decision 208 may be represented as:

$$\hat{x}_i = \sum_s s \cdot p(x_i = s \mid z) \quad \text{EQ. (2)}$$

An estimated mean square error (MSE) of a soft decision 208 may be computed as in EQ. (3). An average MSE may be computed as in EQ. (4).

$$v_i = \sum_s (s - \hat{x}_i)^2 \cdot p(x_i = s \mid z) \quad \text{EQ. (3)}$$

$$\overline{v} = \frac{1}{N} \sum_{i=0}^{N-1} v_i \quad \text{EQ. (4)}$$

Turbo equalizer 122 may further include an FFT module 210 to transform soft decisions $\bar{x}$ 208 to a frequency domain representation or frequency domain elements 212.

Turbo equalizer 122 may further include an equalizer 214 to transform frequency domain tones Y 112 to blocks of frequency domain elements 216 corresponding to estimated symbols of signal 102 (FIG. 1). Equalizer 214 may be implemented to determine elements 216 based on soft-decision frequency domain elements $\bar{X}$ 212, channel estimate 120, and a priori information derived from prior decisions. A priori information may be provided directly to equalizer 214 and/or indirectly through one or more of soft decisions module 206, linear equalizer 114, and/or channel estimator 118, such as described in one or more examples below.

For disambiguation purposes, equalizer 214 may be referred to as an a priori equalizer, and linear equalizer 114 may be referred to as a pre-decoder equalizer.

Equalizer 214 may be implemented to determine elements $Z_k$ of a frequency domain output block Z 216 as:

$$Z_k = \bar{X}_k + W_k(Y_k - \hat{H}_k \bar{X}_k), \forall k = 0 \ldots N-1 \quad \text{EQ. (5)}$$

$$W_k = \frac{\hat{H}_k^*}{|\hat{H}_k|^2 + \frac{\sigma^2}{v}}, \quad \text{EQ. (6)}$$

In EQS. (5) and (6):
k=0, 1, 2, ... N−1;
N denotes a size or number of output frequency bins or tones of FFT module 210, which may correspond to a number of subcarriers of Y 112;
Y denotes channel output 112 in the frequency domain;
$\bar{X}$ denotes Fourier transform 212 of soft decisions 208;
H denotes channel estimate 120;
$\sigma^2$ denotes a noise variance;
$\overline{v}$ denotes an average MSE of soft decisions 208; and
W denotes filter coefficients or weights of a priori equalizer 214.

Turbo equalizer 122 may include noise variance estimator 226 to determine noise variance $\sigma^2$ such as described further below with reference to FIG. 8.

Turbo equalizer 122 may further include an IFFF module 218 to transform blocks of frequency domain elements 216 to time domain decision blocks 124.

Termination Criteria

Soft decision system 206 and a priori equalizer 214 may be implemented to iteratively process blocks of time domain samples 204 and preliminary decisions 228 for each symbol of signal 102.

Turbo equalizer 122 may be implemented to perform a pre-defined and/or fixed number of iterations for each block or symbol before outputting a final decision estimate z 124.

Alternatively, turbo equalizer 122 may include iteration controller 224 to dynamically control a number of turbo equalization iterations performed with respect to a each block or symbol.

A dynamic termination criterion may include a noise-based threshold, which may be based on the average MSE of soft decisions 208. Turbo equalization iterations may be halted, for example, when MSE $\overline{v}$ is below a threshold value. This may serve to increase the number of iterations at a relatively low SNR, which may decrease an equalization error rate. This may also serve to reduce the number of iterations at a relatively high SNR, which may improve numerical stability.

A dynamic termination criterion may be combined with other one or more additional termination criteria, which may be dynamic or static. For example, a maximum number of iterations per block or per symbol may be defined, which may reduce equalizer complexity.

Adaptive Linear Frequency Domain Pre-Decode Equalization

Figure 3:
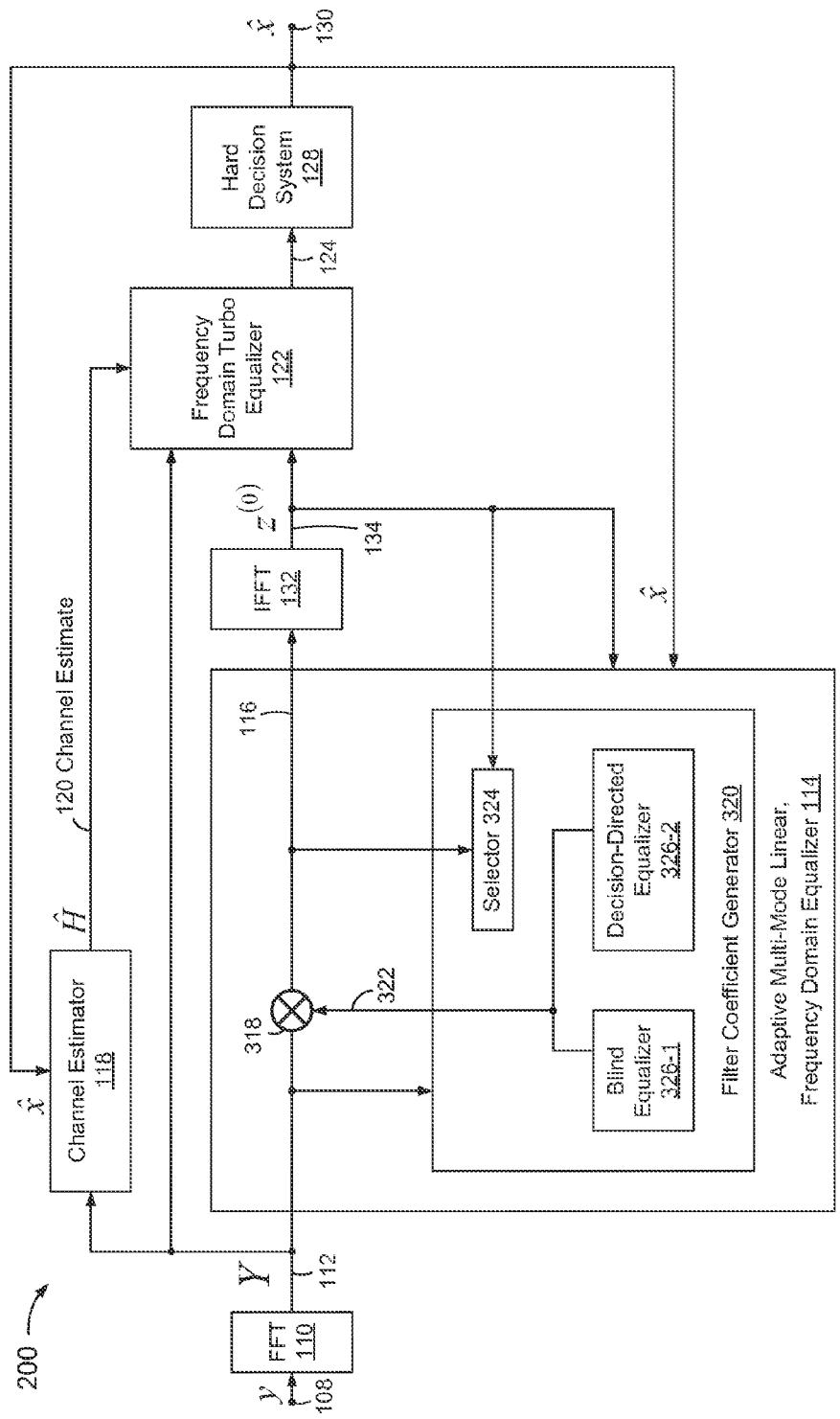
FIG. 3 is a block diagram of a receiver system including an example implementation of an adaptive multi-mode frequency domain linear equalizer.

FIG. 3 is a block diagram of a receiver system 300, including an example implementation of linear equalizer 114. Methods and systems disclosed herein are not limited to the example of FIG. 3.

In FIG. 3, linear equalizer 114 is illustrated as an adaptive multi-mode linear frequency domain equalizer 114 to equalize frequency domain tones Y 112 based on one or more of multiple selectable equalization techniques.

Linear equalizer 114 may include a frequency domain filter 318 to filter frequency domain elements Y 112, and may further include a filter coefficient generator 320 to generate filter coefficients or weights 322.

Coefficient generator 320 may be implemented to compute coefficients 322 based on one or more linear frequency domain equalization techniques, and to adapt coefficients 322 to time-varying properties of channel 104 in FIG. 1.

Coefficient generator 320 may be implemented to adapt coefficients 322 based on an adaptive variable step size (VSS) algorithm. Step size may be varied to control a rate of convergence, and may represent an estimated subcarrier step size.

Coefficient generator 320 may be implemented to compute coefficients 322 based on one or more blind equalization techniques and/or decision-directed techniques such as described in examples below. Coefficient generator 320 is not, however, limited to the examples herein.

Filter coefficient generator 320 may include multiple equalizer modules 326, each to generate filter coefficients 322 based on a corresponding equalization technique.

As an example, filter coefficient generator 320 may include a blind equalizer module 320-1 and a decision-directed equalizer module 320-2.

Blind equalizer module 320-1 may be implemented to adjust filter coefficients 322 to minimize a cost function, which may be based on known or determinable signal statistics, such as a mean energy, and may be implemented to determine filter coefficients 322 without pilot signals or other channel-specific information or statistics.

Blind equalization may be viewed as estimating an equalization filter corresponding to an inverse of a channel impulse response, rather than an estimation of the channel impulse response, and convolving the estimated filter with a received signal to yield an estimation of a corresponding transmitted signal.

Blind equalizer module 320-1 may be implemented based on, for example, a constant modulus (i.e., higher-order statistics) algorithm (CMA), a Sato algorithm, and/or a multi-modulus algorithm (MMA). An example CMA based equalization coefficient generator is described below with reference to FIG. 4.

Decision-directed equalizer module 320-2 may be implemented based on a least means squared (LMS) technique to adapt coefficients 322 to reduce mean squares of an error at output 116. An LMS technique may be viewed as a stochastic gradient descent technique, in that filter coefficients are adapted based on an error at a present or current time.

An example LMS equalization coefficient generator is described below with reference to FIG. 5.

Filter coefficient generator 320 may include a selector 324 to select one of multiple equalizer modules 326 to generate filter coefficients 322 based on one or more criteria.

For example, a conventional LMS equalizer may initially use pilot data to adjust equalizer weights. Thereafter, the LMS equalizer may use decoder decisions to track time varying channels. Where initial pilot data is missed or too short, the output of the LMS equalizer may not be correctly decoded. This may impede the LMS equalizer from converging on a set of filter weights.

A blind coefficient generator may operate without pilot-based adjustments, while a decision-directed coefficient generator may provide a lower output error.

Selector 324 may be implemented to use blind equalizer 326-1 to generate initial filter coefficients or weights, and decision-directed equalizer 326-2 to refine the initial filter coefficients. In this way, decision-directed equalizer 326-2 may provide a relatively low output error without pilot signals.

Selector 324 may be implemented, for example, to select blind equalizer module 320-1 when the MSE of time domain output 134 of linear equalizer 114 is above a threshold, and to select decision-directed equalizer module 320-2 when the MSE is below the threshold. The MSE of time domain output 134 of linear equalizer 114 may be computed using known pilot symbols.

Figure 4:
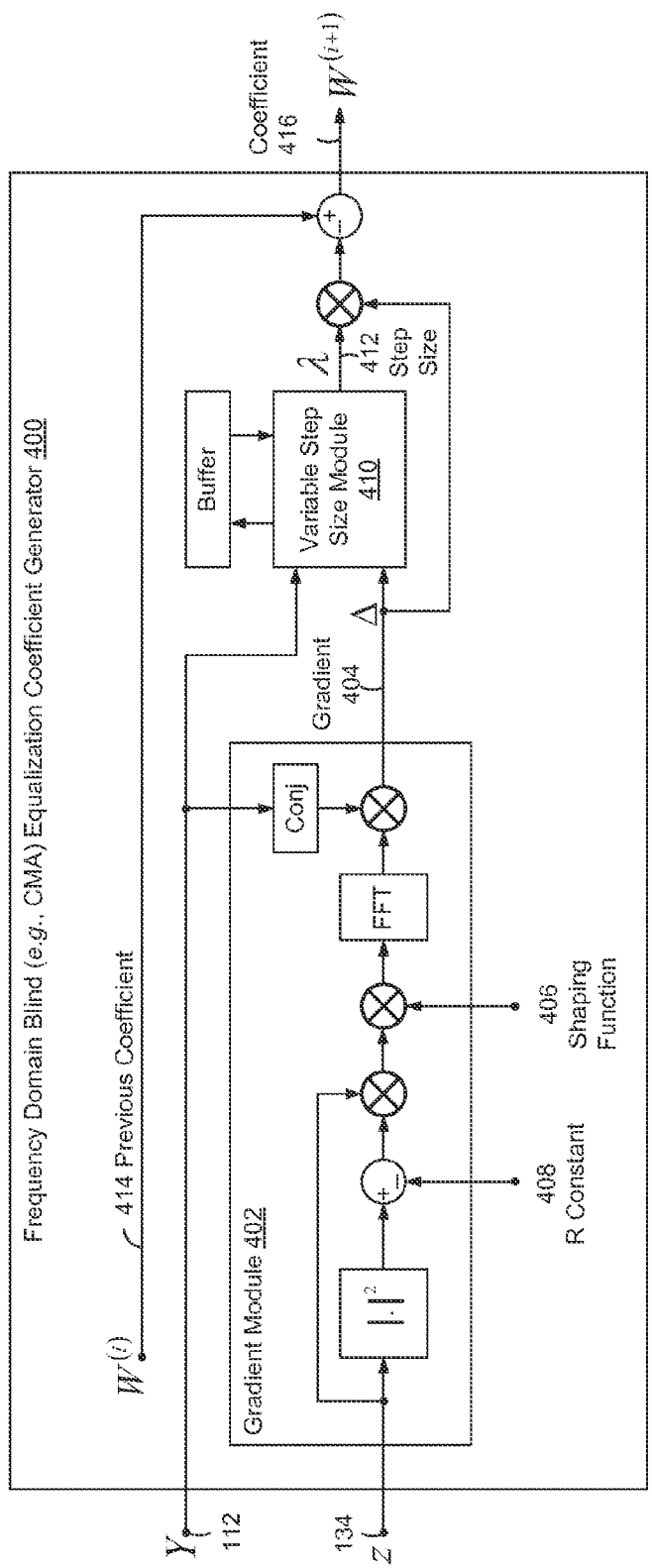
FIG. 4 is a block diagram of a frequency domain based constant modulus algorithm (CMA) equalizer coefficient generator (CMA module).

FIG. 4 is a block diagram of a frequency domain CMA equalizer coefficient generator (CMA module) 400, which may be implemented as blind equalizer module 326-1 in FIG. 3.

CMA module 400 includes a gradient module 402 to generate a gradient $\Delta$ 404 based on a time domain output z 134 of linear equalizer 114, frequency domain tones Y 112, a shaping function 406, and a constant 408.

CMA module 400 further includes a VSS module 410 to estimate a step size $\lambda$ 412 based on frequency domain tones Y 112 and gradient $\Delta$ 404.

CMA module 400 may be implemented to generate a filter coefficient $W^{(i+1)}$ 416 based on a previous filter coefficient $W^{(i)}$ 414, step size $\lambda$ 412, and gradient $\Delta$ 404 as:

$$W^{(i+1)} = W^{(i)} - (\lambda * \Delta) \qquad \text{EQ. (9)}$$

Coefficients 414 and 416 may correspond to coefficients 322 in FIG. 3.

Figure 5:
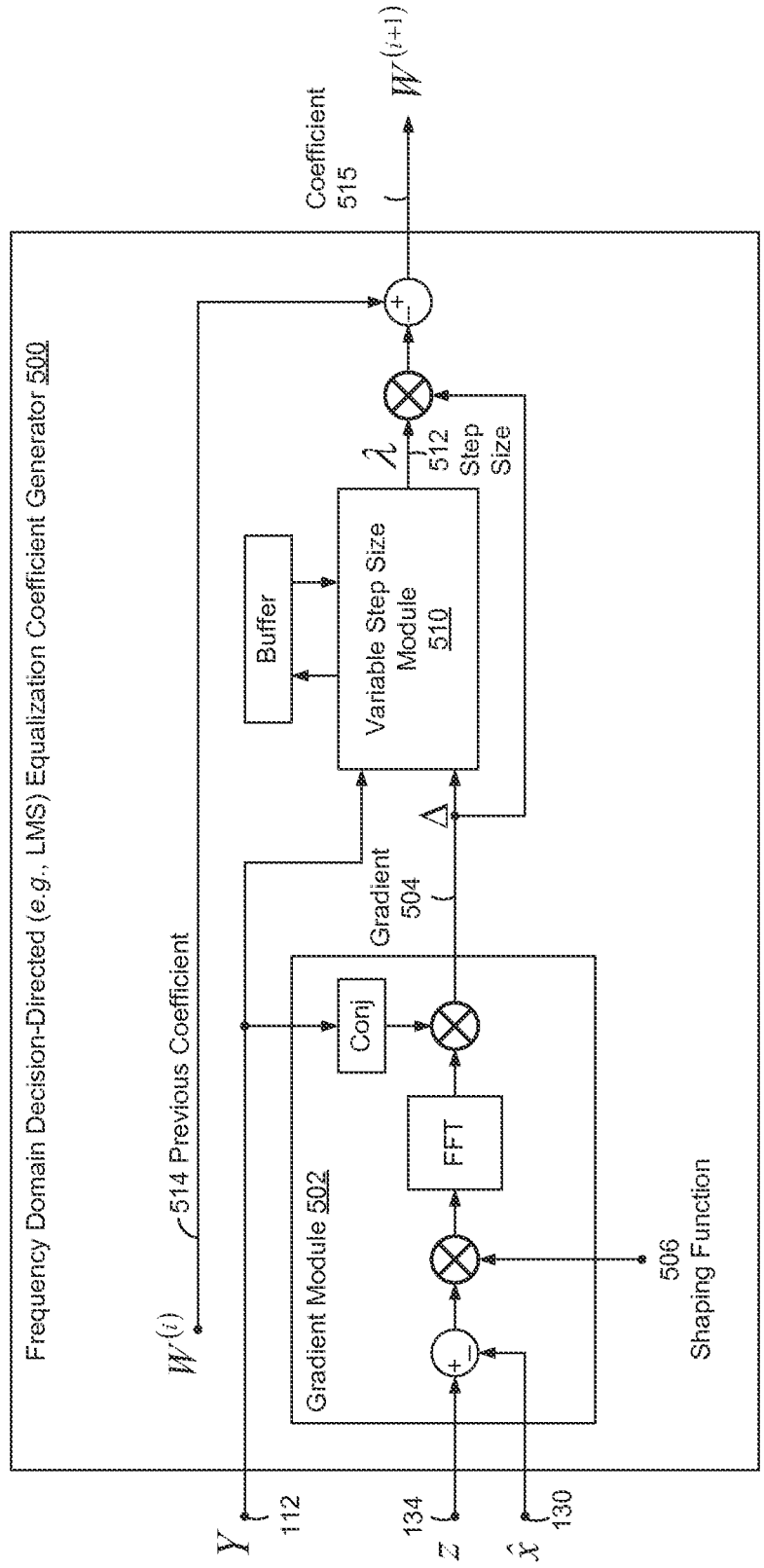
FIG. 5 is a block diagram of a frequency domain based least means squared (LMS) equalizer coefficient generator (LMS module).

FIG. 5 is a block diagram of a frequency domain LMS equalizer coefficient generator (LMS module) 500, which may be implemented as decision-directed equalizer module 326-2 in FIG. 3.

LMS module 500 includes a gradient module 502 to generate a frequency domain gradient $\Delta$ 504 based on a time domain output z 134 of linear equalizer 114, hard decisions $\hat{x}$ 130, frequency domain tones Y 112, and a shaping function 506.

LMS module 500 further includes a variable step size (VSS) module 510 to estimate a step size $\lambda$ 512 based on frequency domain tones Y 112 and gradient $\Delta$ 504.

LMS module 500 may be implemented to generate a filter coefficient $W^{(i+1)}$ 516 based on a previous filter coefficient $W^{(i)}$ 514, step size $\lambda$ 512 and gradient $\Delta$ 504 in accordance with EQ. (9) above.

Coefficients 514 and 516 may correspond to coefficients 322 in FIG. 3.

Adaptive Channel Estimation

As illustrated in EQS. (5) and (6), channel estimate $\hat{H}$ 120 may need to be determined prior to generating a decision estimate 124. In addition, and as described above, channel estimate 120 may need to be determined without reliance on pilot signals.

Figure 6:
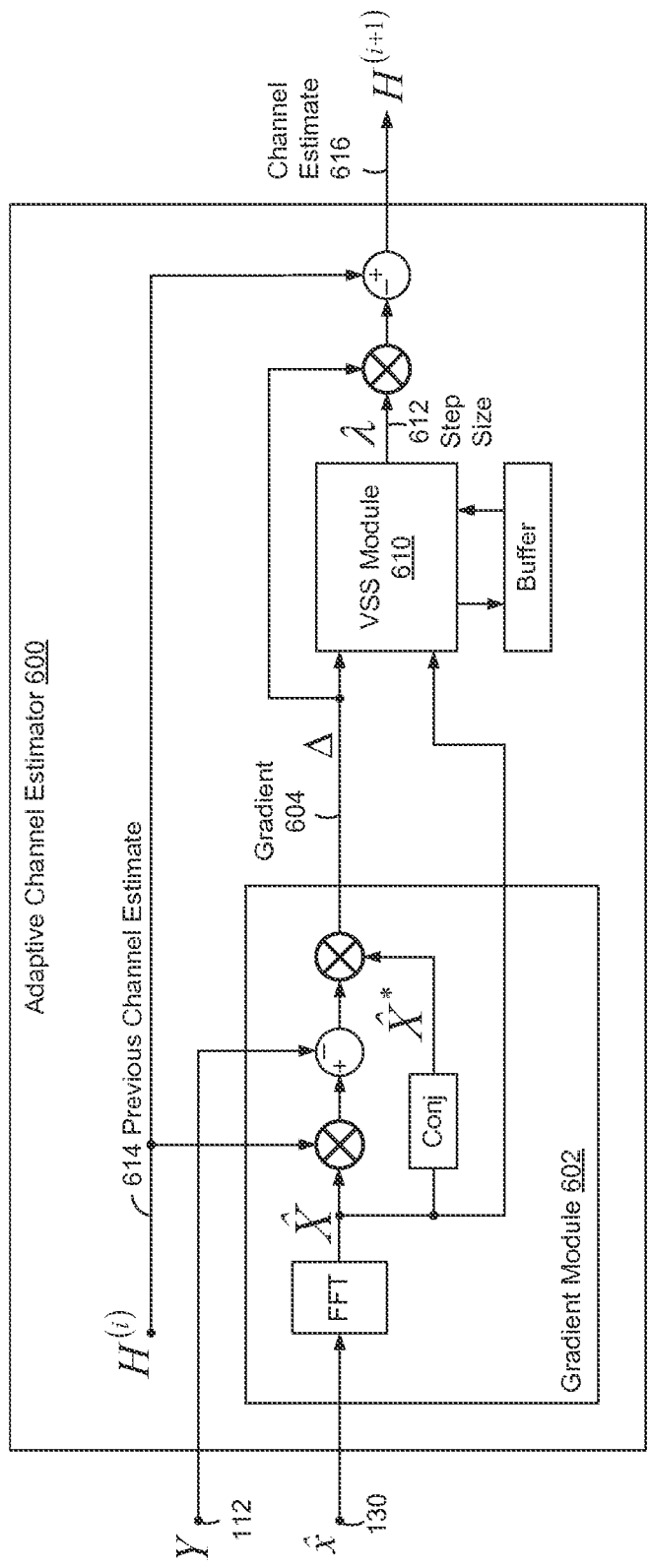
FIG. 6 is a block diagram of an adaptive decision-directed channel estimator.

FIG. 6 is a block diagram of an adaptive decision-directed channel estimator 600 to generate channel estimates $H^{(i+1)}$ 616 without pilot signals. Channel estimates $H^{(i+1)}$ 616 may correspond to channel estimates 120 in FIG. 1 and/or FIG. 2.

Channel estimator 600 includes a gradient module 602 to generate a gradient $\Delta$ 604 based on a previous channel estimate $H^{(i)}$ 614, frequency domain tones Y 112, and a frequency domain transform of a hard decision $\hat{x}$ 130.

Channel estimator 600 further includes a VSS module 610 to estimate a step size $\lambda$ 612 based on gradient $\Delta$ 604 and the frequency domain transform of hard decision $\hat{x}$ 130.

Channel estimator 600 may be implemented to generate channel estimate $H^{(i+1)}$ 616 based on previous channel estimate $H^{(i)}$ 614, gradient $\Delta$ 604, and step size $\lambda$ 612, in accordance with EQ. (8).

$$\hat{H}_k(t+1) = \hat{H}_k(t) - \lambda_k (\hat{X}_k \hat{H}_k(t) - Y_k) \hat{X}_k \qquad \text{EQ. (10)}$$

In EQ. (10):
H$^{(i)}$ represents a channel estimate for a previous block;
H$^{(i+1)}$ represents a channel estimate for a current block; and
$\lambda_k$ represents a step size for the current block.

Variable Step Size Determination

In FIGS. 4, 5, and 6, VSS modules 410, 510, and 610 may be implemented similar to one another, and may represent a shared VSS module. VSS modules 410, 510, and/or 610 may be implemented with one or more conventional VSS techniques, or as described below with reference to FIG. 7.

Figure 7:
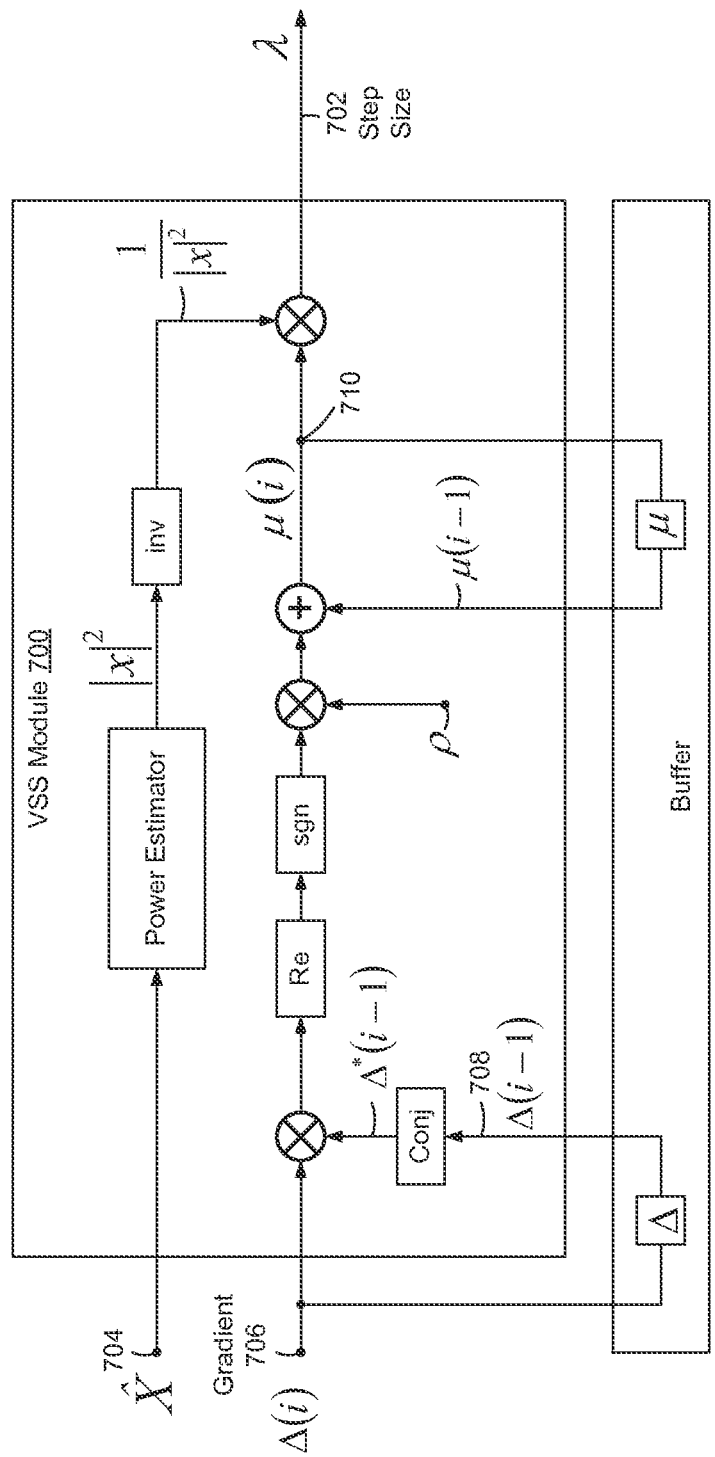
FIG. 7 is a block diagram of a variable step size (VSS) module to generate a VSS for one or more of the CMA module of FIG. 4, the LMS module of FIG. 5, and the channel estimator of FIG. 6.

FIG. 7 is a block diagram of a VSS module 700 to generate an estimated step size 702 as a function of a frequency domain transform $\hat{X}$ 704 of a hard decision $\hat{x}$ 130, a previous value of the gradient, $\Delta(i-1)$ 708, a factor $\rho$, and a previous state of an internal node $\mu$ 710, illustrated here as $\mu(i-1)$. Factor $\rho$ represents a smoothing factor that determines a convergence rate, where $0 \le \rho \le 1$.

Estimated step size 702 may correspond to one or more of estimated step sizes 412, 512, and 612 in corresponding FIGS. 4, 5, and 6.

Similarly, gradient 706 may correspond one or more of gradients 404, 504, and 604 in corresponding FIGS. 4, 5, and 6.

Adaptive Noise Variance Estimation

Figure 8:
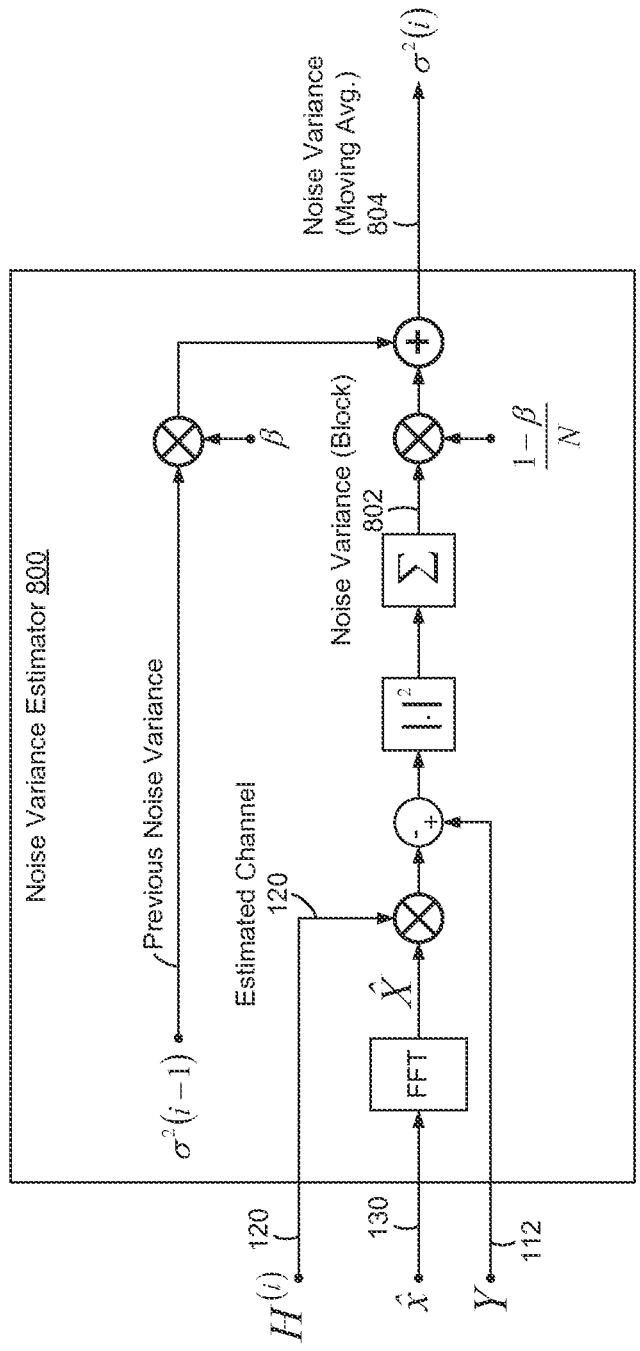
FIG. 8 is a block diagram of an adaptive noise variance estimator to estimate noise variance for turbo equalization.

FIG. 8 is a block diagram of an adaptive noise variance estimator 800 to estimate noise variance $\sigma^2$. Adaptive noise variance estimator 800 may be implemented as noise variance estimator 226 in FIG. 2.

Noise variance estimator 800 may be implemented to compute a noise variance $\hat{\sigma}^2_{block}$ 802 for a block undergoing turbo equalization as a function of a channel estimate H$^{(i)}$ 120, a frequency domain transform $\hat{X}$ of a hard decision $\hat{x}$ 130, and frequency domain tones Y 112, in accordance with EQ. (11):

$$\hat{\sigma}^2_{block} = \frac{1}{N} \sum_{k=0}^{N-1} |Y_k - \hat{H}_k(t+1)\hat{X}_k|^2 \qquad \text{EQ. (11)}$$

Adaptive noise variance estimator 800 may be further implemented to maintain a moving average 804 of the estimated noise variance as:

$$\hat{\sigma}^2 = \hat{\sigma}^2 \beta + (1-\beta)\hat{\sigma}^2_{block} \qquad \text{EQ. (12)}$$

In EQ. (10), $\beta$ is smoothing factor, also referred to herein as a forgetting factor, where $0 \le \beta \le 1$.

Figure 9:
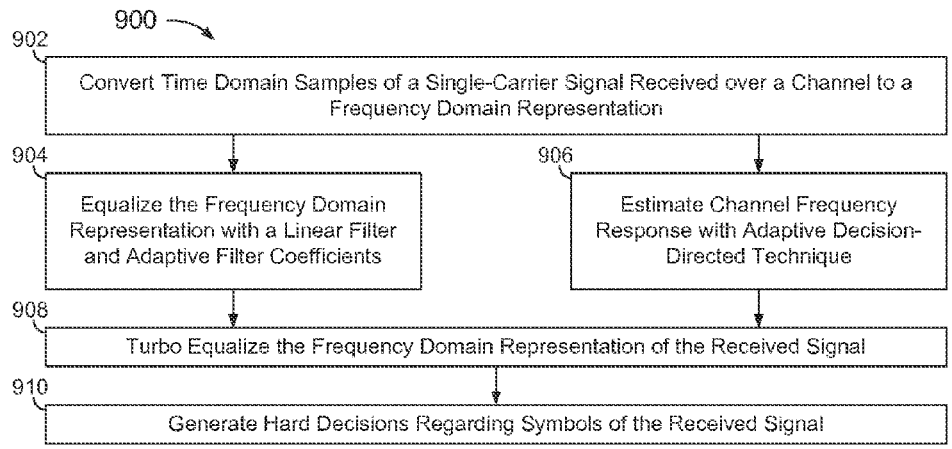
FIG. 9 is a flowchart of a method of estimating symbols of a received signal in the frequency domain.

FIG. 9 is a flowchart of a method 900 of estimating symbols of a received signal in the frequency domain.

At 902, samples of a received single-carrier signal are converted to a frequency domain representation.

At 904, the frequency domain representation of the signal is equalized with a linear filter and adaptive filter coefficients. The equalization at 904 may include selectively equalizing with one of multiple equalization techniques, such as described in one or more examples above.

At 906, a frequency response is estimated for a channel of the received signal using an adaptive decision-directed technique, such as described above with reference to FIG. 6.

At 908, the frequency domain representation of the signal is turbo equalized based on results of the linear equalization at 904 and the estimated channel response.

At 910, hard decisions are generated regarding symbols of the received signal.

Figure 10:
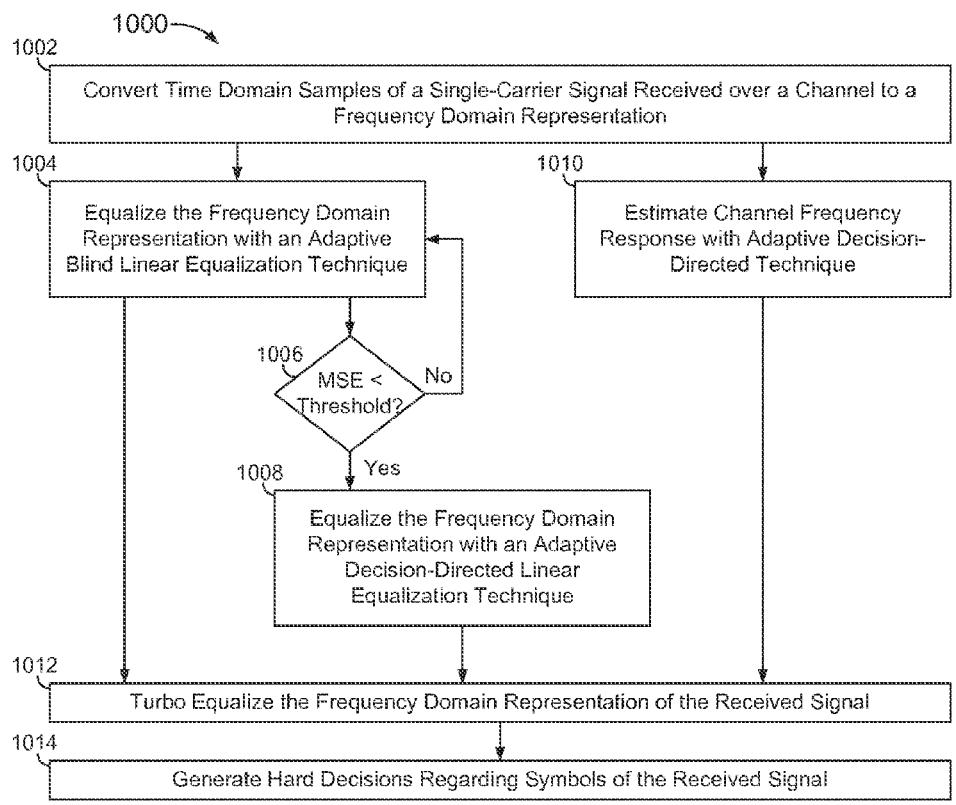
FIG. 10 is a flowchart of a method of estimating symbols of a received signal in the frequency domain, including adaptively linearly equalizing a frequency domain representation of the received signal based on one or more of multiple selectable equalization techniques.

FIG. 10 is a flowchart of a method 1000 of estimating symbols of a received signal in the frequency domain, including adaptively linearly equalizing the frequency domain representation of the received signal based on one or more of multiple selectable techniques.

At 1002, samples of a received single-carrier signal are converted to a frequency domain representation.

At 1004, the frequency domain representation of the signal is equalized with an adaptive blind equalization technique, such as a CMA technique.

At 1006, where the MSE of results of the equalization at 904 are below a threshold, processing may proceed to 1008 where the frequency domain representation of the signal is equalized with an adaptive decision-directed equalization technique, such as a LMS technique.

At 1010, a frequency response is estimated for a channel of the received signal using an adaptive decision-directed technique.

At 1012, the frequency domain representation of the signal is turbo equalized based on results of the linear equalization at 1004 and/or 1008, and the estimated channel response.

At 1014, hard decisions are generated regarding symbols of the received signal.

Figure 11:
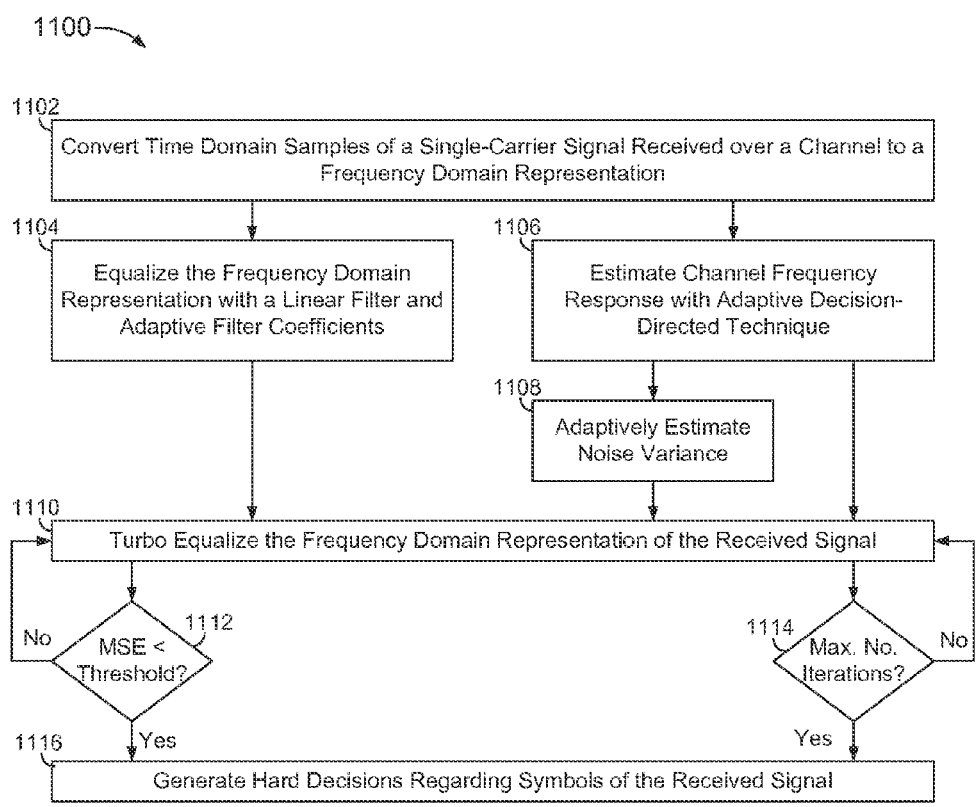
FIG. 11 is a flowchart of a method of estimating symbols of a received signal in the frequency domain based in part on an adaptively estimated noise variance and dynamic turbo equalization termination criteria.

FIG. 11 is a flowchart of a method 1100 of estimating symbols of a received signal in the frequency domain based in part on an adaptively estimated a noise variance and dynamic turbo equalization termination criteria.

At 1102, samples of a received single-carrier signal are converted to a frequency domain representation.

At 1104, the frequency domain representation of the signal is equalized with a linear filter and adaptive filter coefficients such as described above with respect to 904 and/or 1004 through 1008.

At 1106, a frequency response is estimated for a channel of the received signal using an adaptive decision-directed technique.

At 1108, a noise variance is estimated, such as described above with reference to FIG. 8.

At 1110, the frequency domain representation of the signal is turbo equalized based on results of the linear equalization at 1104, the estimated channel response, and the estimated noise variance, such as described above with reference to EQS. (5) and (6).

At 1112, an MSE of a soft decoder output may be compared to a threshold. When the MSE is below the threshold, turbo equalization iteration may be halted and a decision estimate for a symbol may be output for hard decision processing at 1116.

At 1114, the number of iterations of a block being turbo equalized may be compared to a maximum iteration threshold. Where the maximum iteration threshold is reached, turbo equalization iteration may be halted and a decision estimate for a symbol may be output for hard decision processing at 1116.

One or more of methods 900, 1000, and 1100 may include computing variable step sizes for one or more adaptive linear frequency domain equalization techniques and/or channel estimation, such as described in one or more examples above.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Methods and systems disclosed herein may be implemented with respect to one or more of a variety of systems including one or more consumer systems, such as described below with reference to FIG. 12. Methods and systems disclosed herein are not, however, limited to the example of FIG. 12.

Figure 12:
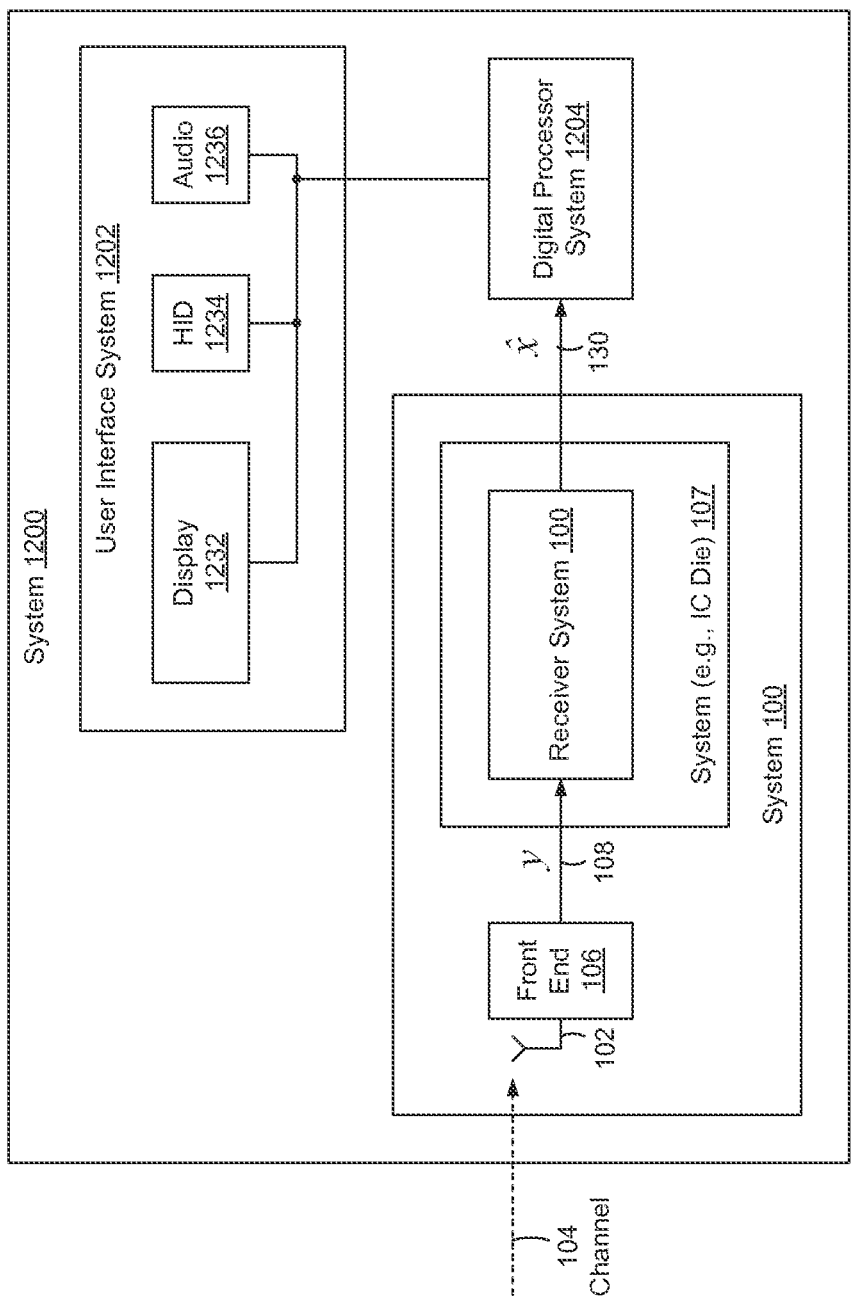
FIG. 12 is a block diagram of a system, including the system of FIG. 1, a user interface system, and a digital processor system.

FIG. 12 is a block diagram of a system 1200 including system 100 of FIG. 1, a user interface system 1202, and a digital processor system 1204 to process hard decisions 130 and output corresponding information to user interface system 1202. In FIG. 12, system 100 or portions thereof may be implemented as described with respect to one or more of examples herein.

System 100, digital processor system 1204, and/or portions thereof, may be implemented within one or more integrated circuit dies, and may be implemented as a system-on-a-chip (SoC).

User interface system 1202 may include a monitor or display 1232 to display information from digital processor system 1230.

User interface system 1202 may include a human interface device (HID) 1234 to provide user input to digital processor system 1230. HID 1234 may include, for example and without limitation, one or more of a key board, a cursor device, a touch-sensitive device, and or a motion and/or image sensor. HID 1234 may include a physical device and/or a virtual device, such as a monitor-displayed or virtual keyboard.

User interface system 1202 may include an audio system 1236 to receive and/or output audible sound.

System 1200 may further include a transmitter system to transmit signals from system 1200.

System 1200 may correspond to, for example, a computer system, a personal communication device, and/or a television set-top box.

System 1200 may include a housing to receive one or more of system 100, digital processor system 1204, user interface system 1202, or portions thereof. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, system 100 may be implemented to receive a digital television broadcast signal, and system 1200 may include a set-top box housing or a portable housing, such as a mobile telephone housing.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. An apparatus, comprising:
   an adaptive linear equalizer to equalize frequency domain samples of a single-carrier signal received over a channel, including to compute a first gradient based on the frequency domain samples of the received signal and prior decisions, compute a first variable step size based on the first gradient, and adapt filter coefficients of the adaptive linear equalizer based on the first variable step size;
   an adaptive decision-directed channel estimator to estimate a characteristic of the channel in the frequency domain, including to compute a second gradient based on the frequency domain samples of the received signal and the prior decisions, compute a second variable step size based on the second gradient, and adapt a prior estimate of the characteristic of the channel based on the second gradient;
   a turbo equalizer to generate estimated decisions based on prior estimated decisions, the output of the adaptive linear equalizer, and an output of the adaptive decision-directed channel estimator; and
   a hard decision system to generate hard decisions based on the estimated decisions.

2. The apparatus of claim 1, wherein the adaptive linear equalizer includes:
   a multi-mode equalizer to equalize the frequency domain samples of the received signal in the frequency domain based on one or more of multiple selectable adaptive linear equalization techniques.

3. The apparatus of claim 2, wherein the adaptive linear equalizer includes:
   a linear filter;
   a blind equalizer to generate initial frequency domain filter coefficients based on a blind equalization technique;
   a decision-directed equalizer to refine the initial frequency domain filter coefficients; and
   a selector to apply filter coefficients from one of the blind equalizer and the decision-directed equalizer based on a measure of noise in the output of the linear filter.

4. The apparatus of claim 3, wherein the adaptive linear equalizer is configured to:
   compute the first gradient based on the frequency domain samples of the received signal and an output of the adaptive linear equalizer when the filter coefficients of the blind equalizer are applied; and
   compute the first gradient based on the frequency domain samples of the received signal, the output of the adaptive linear equalizer, and the hard decisions of the turbo equalizer when the filter coefficients of the decision-directed equalizer are applied.

5. The apparatus of claim 1, wherein the turbo equalizer includes:
   a soft decision system an equalizer to iteratively process blocks of data and the prior decisions; and
   an iteration controller to control a number of the iterations per block based on one or more variables.

6. The apparatus of claim 5, wherein the iteration controller is configured to halt the iterations when a mean square error (MSE) of an output of the soft decision system is below a threshold.

7. The apparatus of claim 6, wherein the iteration controller is further configured to halt the iterations when the number of iterations with respect to a block equals a pre-defined number.

8. The apparatus of claim 1, wherein the turbo equalizer is configured to generate the estimated decisions based further on an estimated noise variance, and where the apparatus further includes:
   an adaptive noise variance estimator to estimate the noise variance in the frequency domain based on the frequency domain representation of the received signal, the estimated channel frequency response, and a frequency domain representation of a hard decision.

9. A system, comprising:
a receiver front end to provide frequency domain samples of a single-carrier signal received over a channel;
a decision system, including,
   an adaptive linear equalizer to equalize the frequency domain samples, including to compute a first gradient based on the frequency domain samples of the received signal and prior decisions, compute a first variable step size based on the first gradient, and adapt filter coefficients of the adaptive linear equalizer based on the first variable step size,
   an adaptive decision-directed channel estimator to estimate a characteristic of the channel in the frequency domain, including to compute a second gradient based on the frequency domain samples of the received signal and the prior decisions, compute a second variable step size based on the second gradient, and adapt a prior estimate of the characteristic of the channel based on the second gradient,
   a turbo equalizer to generate estimated decisions based on prior estimated decisions, an outputs of the adaptive linear equalizer, and an output of the adaptive decision-directed channel estimator,
   a hard decision system to generate hard decisions based on the estimated decisions; and
   a digital signal processor to process the hard decisions and output corresponding information to a user interface system.

10. The system of claim 9, wherein the single-carrier signal includes a digital video broadcast signal, and wherein the digital signal processor includes:
   a digital video signal processor to process the hard decisions and output corresponding video and audio signals to the user interface system.

11. The system of claim 10, configured as a digital set set-top box.

12. The system of claim 10, further including a user interface, wherein the user interface includes a display, an audio system, and a human interface device to receive user input.

13. The system of claim 9, wherein the adaptive linear equalizer includes:
   a multi-mode adaptive linear equalizer to equalize the frequency domain samples of the received signal in the frequency domain based on one or more of multiple selectable adaptive linear equalization techniques.

14. The system of claim 13, wherein the adaptive linear equalizer includes:
   a linear filter;
   a blind equalizer to generate initial frequency domain filter coefficients based on a blind equalization technique;
   a decision-directed equalizer to refine the initial frequency domain filter coefficients; and
   a selector to apply filter coefficients from one of the blind equalizer and the decision-directed equalizer based on a measure of noise in the output of the linear filter.

15. The system of claim 14, wherein the adaptive linear equalizer is configured to:
   compute the first gradient based on the frequency domain samples of the received signal and an output of the adaptive linear equalizer when the filter coefficients of the blind equalizer are applied; and
   compute the first gradient based on the frequency domain samples of the received signal, the output of the adaptive linear equalizer, and the hard decisions of the turbo equalizer when the filter coefficients of the decision-directed equalizer are applied.

16. The system of claim 9, wherein the turbo equalizer includes:
   a soft decision system and an equalizer to iteratively process blocks of data to generate the estimated decisions; and
   an iteration controller to control a number of the iterations per block based on one or more variables.

17. The system of claim 16, wherein the iteration controller is configured to halt the iterations when a mean square error (MSE) of an output of the soft decision system is below a threshold.

18. The system of claim 10, wherein the turbo equalizer is configured to generate the estimated decisions based further on an estimated noise variance, and where the system further includes:
   an adaptive frequency domain noise variance estimator to estimate the noise variance in the frequency domain based on the frequency domain representation of the received signal, the estimated channel frequency response, and a frequency domain representation of a hard decision.

* * * * *